Nov. 10, 1964
E. E. PORTEOUS ETAL
3,156,827
PHOTOSENSITIVE TRANSISTOR CIRCUIT FOR SLAVE FLASH UNIT
Filed July 6, 1961
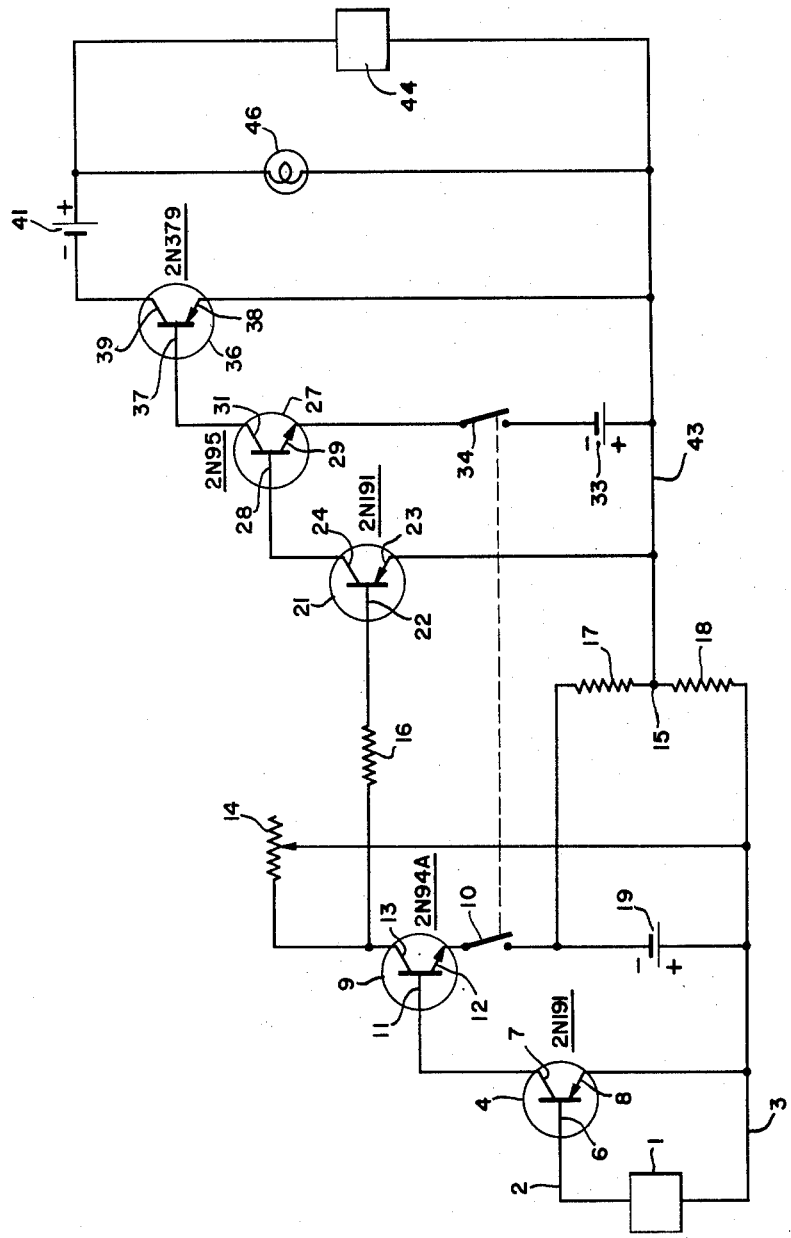
EMMETT E. PORTEOUS
DUANE I. CARPENTER
*INVENTORS.*
BY *Lothrop & West*
ATTORNEYS.

3,156,827
PHOTOSENSITIVE TRANSISTOR CIRCUIT FOR SLAVE FLASH UNIT
Emmett E. Porteous, 2201 K St., and Duane I. Carpenter, 1324 Rushden Drive, both of Sacramento, Calif.
Filed July 6, 1961, Ser. No. 122,240
2 Claims. (Cl. 250—214)

The invention relates to transistor current amplifying devices and, more particularly, to self-contained, portable, slave flash units for use in photography.

Photographers frequently find it necessary, particularly in field use, to light a subject from one or more flash bulbs located at positions removed from the location of the camera itself and from the "master" light source at the camera. The unit or units located at these positions distant from the camera and the "master" flash are known as "slave" flashes, so-called because the slave units are controlled by or are attendant upon the master flash.

Slave flash units of the kinds heretofore available have been only partly satisfactory and in fact have been deficient for many purposes including high-speed photographic work, i.e. work requiring shutter speeds faster than about 1/60 of a second. Furthermore, such units have tended to be bulky, inaccurate, inconsistent in response period and have suffered either from being too unresponsive or too sensitive, the latter fault being responsible for premature triggering, resulting from exposure to stray or ambient light sources in excess of threshold light values.

It is therefore an object of the invention to provide a slave flash unit which is compact, self-contained and easily handled.

It is another object of the invention to provide a slave flash unit which is transistorized and which is light, yet rugged, long-lived and economical of battery life.

It is yet another object of the invention to provide a slave flash unit which, while being extremely fast, accurate and responsive, is not prematurely triggered by ambient or casual light sources.

It is still another object of the invention to provide a device which is capable of producing as amplified electrical analogue from an energy source only where such source provides power in excess of a predetermined amount.

It is a further object of the invention to provide a device which produces an amplified electrical analogue of its input and which nullifies temperature effects attendant upon its use.

It is an even further object of the invention to provide a device which is capable of deriving an electrical analogue of the energy incident upon the device and wherein the analogue is faithful in frequency spectrum response from zero cycles per second to at least six hundred kilocycles per second.

It is still a further object of the invention to provide a slave flash unit which is capable of firing a photographic flash bulb with only the light of another flash bulb as a trigger, and with a delay of approximately only 1.5 milliseconds.

It is another object of the invention to provide a generally improved slave flash unit.

Other objects, together with the foregoing, are described in the following description and shown in the accompanying drawing in which:

The figure is a circuit diagram of the device.

While the slave flash unit of the invention is susceptible of numerous physical embodiments and varieties of uses, depending on the environment and utility requirements, substantial numbers of the herein shown and described embodiment have been made and used and have performed in an eminently satisfactory manner.

The circuitry illustrated in the figure is particularly well suited for adaptation to any of the conventional printed circuit constructions and to incorporation in any appropriate housing. It is therefore believed sufficient to point out that the exterior of the housing will preferably have mounted thereon an off-on switch, a potentiometer knob, a flash bulb mounting, a light bulb used as a balance indicator, and a photo-electric cell. Since the placement and arrangement of these elements on a chassis or housing are matters of preference and manufacturing convenience, a detailed explanation of physical layout is deemed unnecessary.

With reference to the circuit diagram, it will be noted that the slave flash unit comprises an energy conversion element, such as a photo-electric cell 1 (for example, a standard BM2 cell) adapted to convert the incident light energy from the master flash bulb into electrical current. The transducer cell 1 is connected by a wire 2 to the base 6 of a transistor 4 (for example, a 2N191). The other connection of the cell 1 is a common return bus 3.

The emitter electrode 8 of the transistor 4 is connected to the bus 3, whereas the collector electrode 7 is wired to the base electrode 11 of a second transistor 9 (for example, a 2N94A).

The emitter electrode 12 of the transistor 9 is connected to one terminal of a switch 10, the other terminal of the switch 10 being connected to the negative terminal of a battery 19, the positive terminal of the battery 19 connecting, in turn, to the common return bus 3.

The collector electrode 13 of the transistor 9 joins to the base electrode 22 of a transistor 21 (for example, a 2N191) through a coupling resistance 16.

The collector electrode 13 also joins, through a variable resistor 14, to the common bus 3. The variable resistor 14 acts in conjunction with the transistor 9, and a first resistance 17, connected with the negative terminal of the battery 19, as well as a second resistance 18 connected to the bus 3. Suitable adjustment of the variable resistor 14 serves to balance currents flowing through the variable resistor 14 and the transistor 9 against current flowing through the resistances 17 and 18, with the result that there is no voltage difference between the junction 15 of the resistances 17 and 18 and the collector electrode 13 of the transistor 9.

This balancing arrangement is utilized to nullify or zeroize any ambient energy conditions impinging on the transducer 1, and to allow only excursions of energy different from ambient to be amplified as electrical signals in the transistors 4 and 9.

Such excursions as are thereby amplied are further amplified by a further stage comprising, in conjunction with a common bus 43 connected to the junction 15, the emitter electrode 23 of a transistor 21 (for example, a 2N191). The collector electrode 24 of the transistor 21 connects directly to the base electrode 28 of a transistor 27 (for example, a 2N95).

The transistor 27 has its emitter electrode 29 joined to one pole of a switch 34, there being a mechanical ganging or connection between the switches 10 and 34 to provide unitary on-off action. The other pole of the switch 34 is joined to the negative terminal of a battery 33, the positive terminal thereof being joined to the common bus 43.

The collector electrode 31 of the transistor 27 joins directly to the base electrode 37 of a transistor 36 (for example, a 2N379), the emitter electrode 38 being connected to the bus 43.

Connected to collector electrode 39 of the transistor 36 is the negative terminal of a battery 41, the positive terminal of the battery being connected to the flash bulb mounting 44, or device, to be actuated. The remaining terminal of the device 44 is connected to the bus 43.

Connected directly across the actuator 44 is a low-current visual indicator 46 adapted to indicate the balance condition of the slave flash unit, a zero current flow indicating a balanced condition, with balance being attained by adjustment of the variable resistor 14.

Economical and efficient current amplification is enhanced by the "complementary symmetry" configuration found in transistor circuitry literature (e.g. Transistor Electronics by Lo, Endres, Zawels, Waldhaver and Cheng, published 1955 by Prentice-Hall, Englewood Cliffs, N.J.) and utilized in the present invention. The transistors 4, 21 and 36 are PNP types whereas transistors 9 and 27 are NPN types, for the polarities indicated on the batteries 19, 33 and 41.

Speed of operation is limited only by the final transistor 36 and the firing time of the device 44. When used to fire a photographic flash bulb, using only the impinging light of another flash bulb as the trigger, a delay of about $1.5 \times 10^{-3}$ seconds (1.5 milliseconds) is standard. A normal photographic camera may be used at shutter speeds of $1/500$ second, or even faster, with this unit. The fastest practicable shutter speeds with former devices has been about $1/60$ second.

It is also to be recognized that by appropriate substitution of input transformation or transducer elements that the present device will also operate on sound, fluid or hydraulic energy, either to provide an amplified electrical analogue of said energies or to actuate electrical, electro-mechanical or electro-chemical devices. In any such cases, there can be incorporated, as described above in detail, means for suppression of ambient input conditions such that only desired phenomena sensibly different from ambient will be delivered to the output.

What is claimed is:
1. A transistor slave flash unit comprising:
   (*a*) a transducer adapted to transform energy impinging on said transducer to an electrical current;
   (*b*) a first transistor member connected to said transducer, said first transistor member having a predetermined electrical configuration;
   (*c*) a second transistor member connected to said first transistor member and being in complementary symmetrical configuration with respect thereto, said second transistor member including an emitter electrode and a collector electrode;
   (*d*) a first common bus connected to said transducer;
   (*e*) a battery interposed in a conductor leading from said emitter electrode to said first common bus;
   (*f*) a pair of series resistances in shunt with said battery and joined at an intermediate junction;
   (*g*) a variable resistor interposed in a conductor leading from said collector electrode to said first common bus, said variable resistor being capable of equalizing the voltages existing at said junction and said collector electrode whereby ambient energy conditions impinging on said transducer are nullified;
   (*h*) a second common bus connected to said junction;
   (*i*) a plurality of additional transistor members connected to said second common bus; and,
   (*j*) means connected to the last of said additional transistor members and to said second common bus for deriving an electrical analogue of energy impinging on said transducer in excess of ambient energy.
2. The device of claim 1 wherein said transducer is a photoelectric cell of the photovoltaic type and said electrical analogue deriving means is a flashbulb.

References Cited in the file of this patent
UNITED STATES PATENTS

| | | |
|---|---|---|
| 2,336,633 | Parson | Dec. 14, 1943 |
| 2,508,242 | Finklestein | May 16, 1950 |
| 2,577,683 | Hoffman | Dec. 4, 1951 |
| 2,652,460 | Wallace | Sept. 15, 1953 |
| 2,808,471 | Poucel et al. | Oct. 1, 1957 |
| 2,971,134 | Cockrell | Feb. 7, 1961 |
| 2,973,456 | Smyth | Feb. 28, 1961 |